United States Patent [19]

von Benda et al.

[11] Patent Number: 5,160,659
[45] Date of Patent: * Nov. 3, 1992

[54] PASTE FOR THE VIBRATION FILLING OF FOAM-STRUCTURE AND FIBER-STRUCTURE ELECTRODE PLATES FOR GALVANIC CELLS

[75] Inventors: Klaus von Benda, Nurtingen; Gabor Benczur-Urmossy, Stuttgart, both of Fed. Rep. of Germany

[73] Assignee: Deutsche Automobilgesellschaft mbH, Fed. Rep. of Germany

[*] Notice: The portion of the term of this patent subsequent to Jul. 10, 2007 has been disclaimed.

[21] Appl. No.: 619,018

[22] Filed: Nov. 28, 1990

Related U.S. Application Data

[62] Division of Ser. No. 350,403, May 11, 1989, Pat. No. 4,974,644.

[30] Foreign Application Priority Data

May 11, 1988 [DE] Fed. Rep. of Germany ....... 3816232

[51] Int. Cl.$^5$ ............................................. H01M 4/32
[52] U.S. Cl. .................. 252/182.1; 429/223
[58] Field of Search ...................... 252/182.1; 429/223

[56] References Cited

U.S. PATENT DOCUMENTS

| | | | |
|---|---|---|---|
| 3,328,203 | 6/1967 | Jeannin et al. | 252/182.1 |
| 3,502,505 | 3/1970 | Jackson et al. | 252/182.1 |
| 4,049,027 | 9/1977 | Seiger | 252/182.1 |
| 4,156,056 | 5/1979 | Zellhoefer | 252/182.1 |
| 4,169,075 | 9/1979 | Kuhling et al. | 252/313.1 |
| 4,363,742 | 12/1982 | Stone | 252/182.1 |
| 4,414,303 | 11/1983 | Williamson et al. | 252/182.1 |
| 4,443,526 | 4/1984 | Jackovitz et al. | 252/182.1 |
| 4,608,325 | 8/1986 | Ismail | 252/182.1 |
| 4,940,553 | 7/1990 | von Benda et al. | 252/182.1 |
| 4,974,644 | 12/1990 | von Benda et al. | 429/225 |
| 5,094,774 | 3/1992 | Imhof et al. | 252/182.1 |

*Primary Examiner*—Edward A. Miller
*Attorney, Agent, or Firm*—Evenson, Wands, Edwards, Lenahan & McKeown

[57] ABSTRACT

A paste for vibration filling of foam-structure or fiber-structure electrode plates for galvanic cells, particularly for electrical accumulators, said paste having an active substance content of about 25 to 60 percent by volume, a maximum active particle size of about 0.04 mm and in an unvibrated state a yield value of approximately 10 to 120 Pa and a plastic viscosity of about 1.0 to 1.0 Pas at 20° C. The paste is preferably set in vibration with a frequency of about 40 to 125 Hz and an amplitude of about 0.1 to 1.5 mm by a vibration transmitter fitted inside a tank containing the paste.

4 Claims, 1 Drawing Sheet

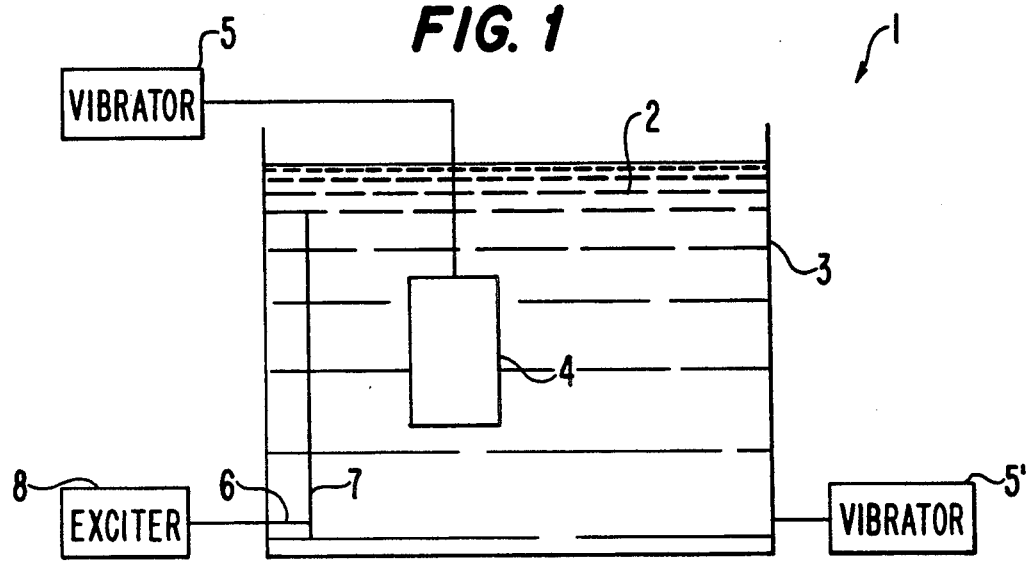
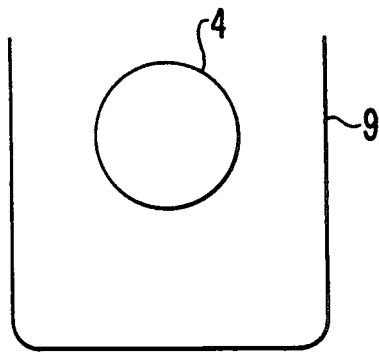
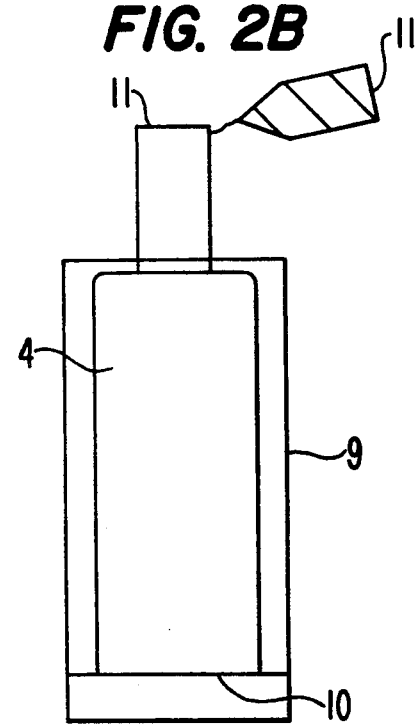

PASTE FOR THE VIBRATION FILLING OF FOAM-STRUCTURE AND FIBER-STRUCTURE ELECTRODE PLATES FOR GALVANIC CELLS

This is a divisional of application Ser. No. 07/350,403, filed May 11, 1989, now U.S. Pat. No. 4,974,644.

BACKGROUND AND SUMMARY OF THE INVENTION

The present invention relates to a method for filling foam-structure or fiber-structure electrode plates with pastes of active substance for galvanic cells, particularly for electrical accumulators, as well as to a composition of the pastes of active substance.

Electrode plates having a foam or fiber structure are being increasingly widely used because they present advantages compared to the cheap cast and expanded metal grids as regards electrical load capacity and useful life. The fibers of these plates may consist entirely of metal, such as nickel-plated steel wool for example, or they may be formed by metallization of plastic non-woven fabrics, according to U.S. Pat. No. 3,560,262 for example.

Foam-structure plates, which are also frequently known as reticulated plates, can be produced by the metallization of open-cell foam materials such as carbonized foam materials according to Great Britain patent specification No. 1,211,428 for example, or of foam materials according to German Published, Unexamined Patent Application (DE-OS) 2,427,422 or by foaming a plastic material containing a metal powder and subsequent pyrolysis according to European Patent Specification (EP-PS) 87,160. For reasons of production, the pores of these reticulated plates form polyhedra of approximately spherical shape and vary far less in shape and size than the pores of plates which consist of nonwoven textile materials. Due to the gas bubble sizes dictated by the process technology, the pore diameter of the reticulated plates is much greater than that of sintered plates produced by powder metallurgy, and, a considerable reduction in the thickness of the reticulated plates is generally undertaken by rolling or pressing. The plastic fraction is almost always removed from the reticulated plates by pyrolysis, so that all-metal plates with no plastic fraction are obtained in the final result.

The following classification of electrode plates categories by pore sizes and pore shapes can be made:

a) Very large pores in the millimeter range in the form of bi-dimensional holes regularly arranged: Cast grids, expanded metal grids, nets.

b) Large pores, polyhedra approximating to spherical shape, pores cross-linked three-dimensionally, narrow pore-size distribution: Reticulated (foam) plates.

c) Medium-sized pores, anisodimensional (widely different dimensions of a pore in different physical directions), pore delimitation by partially elongate bars, three-dimensional cross-linkage of the pores: fiber plates and compressed foam materials.

d) Small pores, three-dimensionally cross-linked, pore delimitation by sintered necks, approximately 60% of the total pore volume in the form of pores in the range 4 to 15 micrometers (Falk and Salkind, Alkaline Storage Batteries, Publisher J. Wiley 1969, Page 122): powder metallurgical sintered plates.

Various techniques which are oriented by the above enumerated pore characteristics, have been developed for the introduction of the active substance by filling or impregnation.

The filling of the plates mentioned under category a), which are provided with two-dimensional, optically transparent hole patterns, is generally done by pressing in a paste of active substance mechanically, as for the electrodes of lead accumulators, where this technology has been applied to cast grids and expanded metal grids. Rollers or doctor blades are used as pressure-imparting elements. Since the active substance must be sufficiently firm not to flow out of the holes after pasting, but sufficiently plastic to be still spreadable, high viscosity thixotropic pastes are used (e.g. German patent specification Nos. (DE-PS) 2,517,368 or (DE-PS) 2,602,904) which become sufficiently fluid under the pressure of the roller or of the doctor blade.

For narrow-pored plates with a three-dimensional pore network, this method becomes more difficult the narrower the pores are. Only chemical or electrochemical precipitation methods of embedding the active substances have therefore been successful for sintered plates, because the solutions can penetrate even into very small pores. However, the methods which operate with solutions suffer from disadvantages of tediousness, accompanying frame corrosion and also contamination of the precipitation products by anions of the initial compound, nitrate, sulphate or chloride ions being typical for example. The tediousness of the filling is due, in principle, to the much lower ion concentration in the solutions as compared to the solids, so that much time is required to build up the desired high solid concentration of the active substance in the pore volume of the electrode.

Both the precipitation impregnations known for category d) and also mechanical filling methods with suspensions and pastes have been described for the foam-structure and fiber-structure plates mentioned under categories b) and c). Naturally, the less expensive mechanical methods encounter increasing difficulty of realization with a reduction in the pore size, because suspensions and pastes do not penetrate into a network of fine pores as easily as solutions.

A filling with a paste of active substance with agitation is described for reticulated plates with large pores between 230 and 2,540 micrometers in German patent specification No. (DE-PS) 1,596,023 (which correspond to U.S. Pat. No. 3,287,164). The liquid is 30% caustic soda solution. No information is given as to the viscosity of the paste, the agitation conditions (frequency, intensity, arrangement). However, the filling of such large pores presents no problems.

The filling of a foam plate with a pore diameter of 100 to 500 micrometers without metallization is described with similar terseness in German Published, Examined Patent Application (DE-AS) 1,108,759. According to this document an active substance placed in suspension is pressed in, optionally with agitation. However, according to the description the active substance suspension cannot be a paste.

An apparatus for the impregnation of reticulated plates (foam metal) with paste, likewise with no disclosure concerning the details of the pore size, is described in U.S. Pat. No. 4,217,939. The plate is guided horizontally on a perforated plate over a paste tank, in which the paste is moved by stirrers and pressed upwards into and round the plate, the paste being swept into the plate from above by reciprocating doctor blades. However, it is not immediately possible then to displace the air out of the pores of the plates by the paste. On the contrary, a preimpregnation of the plate with water is necessary for this purpose. The dilution of the paste with this water creates difficulties in adjusting the concentration of the paste.

The filling of fiber-plate electrodes with paste is described in a plurality of applications.

U.S. Pat. No. 3,262,815, corresponding to Great Britain patent specifications No. 1,109,524, describes three different methods for introducing a suspension of an active substance into a fiber plate: 1) working in mechanically, 2) depth filtration and 3) introducing the plate into a mechanically moved (agitated) bath, where the plate or the bath may be set in motion. None of these three methods operates satisfactorily by itself, because the disclosure is directed at a process which should combine all three methods. Thus, after treatment in accordance with method step 3) noted above, the plate should still undergo an after-treatment according to method steps 2) and 1). No information is given as to the mechanical characteristics of the paste; however, the treatment according to method step 3) alone clearly does not provide a satisfactory filling.

Then again, in a later application, German Published, Unexamined Patent Application (DE-OS) 2,436,704, the same applicant refers to the basic/process of working in a thixotrophic paste by pressure roller application, as already described above for lead grids, except that the method is applied to nickel fiber plates of 92% porosity and 1.7 mm thickness (Example 1). After filling, these plates are compressed to 0.9 mm thickness. This high compression, which would reduce the porosity of an unfilled plate from 92% to 85%, indicates that a paste filling into the finished frame of final thickness clearly does not succeed, a double paste application being required even for the still uncompressed frame of 92% porosity.

German Published, Unexamined Patent Applications (DE-OS) 2,427,421 (which corresponds to U.S. Pat. No. 3,877,987) and (DE-OS) 2,427,422 (which corresponds to U.S. Pat. No. 3,926,671) refer in identical texts to the possibility of filling fiber plates with suspensions of active substance which are pourable and therefore highly fluid. The suspension is poured onto the horizontally positioned plate and a vibrator electrode arranged parallel to the frame, which is in communication with an ultrasonic generator, and in combination with vacuum ensures a substantial filling, which however still requires completion by a following precipitation impregnation. According to the descriptions in these applications, the suspensions of active substance are not pastes; nor is the term paste used.

The specifications discussed above refer to plates which must be classified under a specific category a) to c) of the above-mentioned frame classification according to the pore size. However, a vibration filling with pastes under the influence of ultrasonic vibrations, and optionally of vacuum, is disclosed by German Published, Examined Patent Application (DE-AS) 1,287,663, which is claimed to be useful both for fiber plates of category (c) and also for sintered plates of category (d) produced by powder metallurgy. By this filling method the paste is applied in a thin uniform layer onto the ultrasonic vibrator, and a pressure element presses the paste layer together with the plates strongly against the vibrator, a perforated foil being placed between electrode plate and pressure element. No detailed information is given as to the flow characteristics of the paste, except for the example, according to which the paste should have a consistency somewhat like spreadable butter.

The horizontal positioning of the plate, which is adopted for all filling processes under the influence of vibrations, is considered unavoidable because in the vibration field the dispersed solid has a tendency to settle downwards, whereas the liquid moves upwards (See German Published, Examined Patent Application (DE-AS) 1,287,663). However, considerable disadvantages are associated with the horizontal positioning. It is known for instance for the filled plate to stick very firmly to the pressure plate or to the surface of the vibrator, which has the result that special removal technologies were proposed (See German Patent Specifications (DE-PS) 1,210,417 for example) or that the corresponding parts threatened by sticking are provided with an antiadhesion coating or with an antiadhesion foil. Furthermore, the production process according to the two last mentioned patents, whereby the plate to be filled is sandwiched horizontally between two layers of the active substance and is then filled under pressure and the influence of vibrations, is naturally also extraordinarily complicated.

To sum up, it can be stated that in the use of pourable suspensions, such as they are described in German Published, Examined Patent Application (DE-AS) 1,108,759, German Published, Unexamined Patent Application (DE-OS) 2,427,421, U.S. Pat. No. 3,262,815, U.S. Pat. No. 3,877,987 or U.S. Pat. No. 3, 926,671 for example, a single filling operation does not effect an adequate filling of the pores, so that a plurality of impregnation passes or following impregnations are recommended.

In the use of pastes of high solids content, i.e. pastes being understood to mean, according to Rompp, Chemielexikon 8th Edition 1985, Volume 4, Page 3006, solid/liquid dispersions of doughy consistence, and therefore not pourable suspensions, the difficulties known from U.S. Pat. No. 4,217,939 and German Published, Examined Patent Application (DE-AS) 1,287,663 as described above result.

An object of the present invention is to provide a method for the filling of foam-structure or fiber-structure electrode plates with a paste of active substance which is simple, fast and can be performed without a major outlay of apparatus or effort.

A further object of the present invention is to provide a paste of active substance suited for the method of filling the electrode plates of the present invention.

Thus, in accordance with preferred embodiments of the present invention, the electrode plates to be filled are immersed in a tank filled with a paste of active substance, in which the active substance is set in vibration. The paste in the tank has an active substance content of about 25 to 60 vol %, with a maximum granulometry of the active particles of about 0.04 mm and a yield value of about 10 to 120 Pa at about 20° C. and a plastic viscosity of about 0.1 to 1 Pas at about 20° C. The viscosity particulars here refer to a paste which is not in vibration. This is because a reliable viscosimetry is not known for a vibrating paste.

Other objects, advantages and novel features of the present invention will become apparent from the following detailed description of the invention when considered in conjunction with the accompanying drawings.

BRIEF DESCRIPTION OF THE DRAWINGS

FIG. 1 is a side, sectional view schematically illustrating alternative embodiments of an apparatus for performing an impregnation of foam-structure and fiber-structure electrode frames in accordance with the method of the present invention;

FIG. 2A is a schematic view illustrating one embodiment of a vibration plate which is provided with a U-shaped profile; and FIG. 2B is a side, sectional view of an alternative embodiment of the vibration plate of FIG. 2A which is provided with a base part for setting an immersion depth of a frame to be filled.

DETAILED DESCRIPTION OF PREFERRED EMBODIMENTS OF THE PRESENT INVENTION

Concentrated suspensions belong to the class of plastic substances, that is to say they have a yield value. The yield value assured hereinafter is defined as the smallest force per unit area (shear stress, tangential stress) which is required to cause a flow. For an explanation of the rheological terms and measuring methods, attention is drawn to the document entitled "Measurement of rheological characteristics", Bulletin T 990 D-7309, Contraves AG Zurich, Pages 16 to 20 and to the publication by A. Finke and W. Heinz entitled "On the determination of the yield value of coarsely disperse systems", Rheological Aca, 1, (1961), 530 to 538. The rheometrical verification of the paste characteristics can be performed according to the above-mentioned literature with a viscosimeter.

The assignee company of the present application has found the rotary viscosimeter Rotovisco RV 12 (Haake Company) with the measuring devices NV and MVI successful. Shear rates of at least 100/s should be obtained. The return curve is recommended for evaluation, and good thermostatization must be ensured. A so-called grindometer, in which a paste spread of decreasing thickness is assessed, is sufficient for the measurement of the maximum granulometry.

The viscosity of the paste may be influenced not only by the quantity and the granulometry of the active substance, but may also be modified by the addition of other substances. The expert is familiar, for example, with the addition of wetting agents (as disclosed by German Published, Examined Patent Application (DE-AS) 1,108,759 for example), dispersing agents (as disclosed by German Published, Unexamined Patent Application (DE-OS) 2,346,704 for example), expanders (as disclosed by German Published Examined Patent Application (DE-AS) 1,287,663 or), German Pat. Nos. (DE-PS) 2,517,368, (DE-PS) 2,602,904 for example), thickening agents (as described by German Published, Unexamined Patent Application (DE-OS) 2,436,704,and U.S. Pat. No. 4,217,939 for example), but also carbon black (as disclosed by U.S. Pat. No. 3,262,815 for example).

The granulometry of the particles of the paste of active substance should not exceed about 0.04 mm, because difficulties with the filling may otherwise arise in the case of fine pores. The paste may be produced from any kind of active substances known, provided they do not react with the dispersion liquid.

The electrode plates to be filled are immersed horizontally or vertically, generally hanging up by their terminal tab, into the tank filled with the paste of active substance set in vibration, and are simply withdrawn from it again in the same way after filling. The mere possibility of being able to fill the plaque completely by simple suspension in the paste of active substance represents a quite significant simplification of the method compared to the methods hitherto known.

The paste of active substance is set in vibration in order to allow the paste of active substance to penetrate into the pores of the frames. This is not restricted to the ultrasonic range. Mechanical agitators, which deliver high power at low cost, may also be used advantageously. The frequency range from about 40 to approximately 125 Hz has been found particularly successful, because these latter vibrations can be derived particularly favorably from the main frequencies generally in use. The agitator should preferably be operated in the acceleration range from about 1 to 15 g. Acceleration $b_g$ (in g) and frequency f and amplitude A are related by the equation $b_g = 4\pi^2 f^2 A$.

For the method according to preferred embodiments of the present invention, an apparatus 1 for performing the impregnations is of extremely simple construction as shown in FIG. 1. The paste 2 of active substance is filled into a tank 3 and a plate 4 to be filled is immersed into the liquefied paste 2 set in vibration. The vessel 3 or the plate 4 to be filled is set in vibration by means of vibrator 5 or 5'; respectively, that is to say agitated, in order to introduce the vibrations into the paste 2. However, in the case of large quantities of paste, such as must be used in production, problems arise with the agitation of correspondingly large tanks. In this case, the vibration may be transmitted to the paste by transmitters 6 which are located inside the tank 3. Such transmitters 6 generally consist of a plate 7 which is driven by an exciter 8 arranged outside the paste bath. It is particularly favorable to use a vibration transmitter 6 which consists of a plate 9 having a U-shaped profile open at its end faces and receiving the electrode plate 4 totally and without contact at least at the sides as best shown in FIG. 2A. The sides of this U-shaped plate 9 as shown in FIG. 2B are approximately as high as the frame 4 to be filled, which is introduced from above and a bottom edge of which may be braced against a base part 10 of the U-shaped as illustrated in FIG. 2A, so that the immersion depth of the plate 4 is defined. This may be advantageous if it is desired to prevent an electrode tab 11 from being contaminated with paste.

The amplitude with which the tank, the plate to be filled or the vibration transmitter vibrate, should be approximately between 0.1 to 1.5 mm. Larger amplitudes do not generally produce an improved effect, and smaller amplitudes sometimes dictate longer impregnation times. The development of standing waves on the surface of the paste bath may serve as an optical aid for the correct adjustment of frequency and amplitude. The direction in which the vibrations are introduced into the paste bath is not critical for the method. However, it is preferred to introduce the vibrations so that the wave front strikes the plate to be filled at right angles. The utilization of the wave energy is optimum in this case. This is achieved most simply by arranging the vibration transmitter parallel to the plate to be filled, as is already known per se from the cited prior art.

In the course of the method according to preferred embodiments, the empty plates are immersed individually or simultaneously in groups into the paste bath with continuous vibration. As air escapes, the plates become filled after about 10 to 30 seconds. The dwell time may be further prolonged up to 2 to 3 minutes with a gain in paste filling, i.e., in landing of the plate. After the plates are extracted from the bath the surplus paste is wiped off by pairs of rubber lips which are arranged above the paste bath. Cleaning by brushes is likewise possible.

The method makes it possible to fill large quantities of electrode plates rapidly and without major outlay. The surprising fact here is that, contrary to the opinion expressed in the literature, no segregation of the paste bath results from the application of the vibrations.

EXAMPLE 1

About 480 g ZnO were mixed with about 128 ml water which contained about 0.2% of a dispersing agent based on a sodium salt of a polycarboxylic acid of moderate degree of polymerization (Tamol PA, Manufacturer BASF) and about 2% sodium triphosphate, in a ball mill for four hours. The flow curve of the resulting paste was measured with a rotary viscosimeter (Haake Company Rotovisco with NV measuring device). It showed the typical picture of an ideally plastic so-called Bingham substance. The flow curve of the paste was fully described by the yield value of about 24 Pa and by the plastic viscosity of about 230 mPas. The paste contained about 40 vol % ZnO.

A copper foam plate about 2 mm thick having a porosity of about 92% at about 100$\mu$ mean pore size was used as electrode plates. The paste was loaded into a prismatic vessel which was fastened on an electromagnetically driven agitator (shaker). The paste was set in vibration at about 50 Hz and about 0.5 mm amplitude and liquefied. The liquid state was detectable by the development of standing waves on the surface of the suspension. The copper foam frame was immersed vertically into the suspension. The emergence of air bubbles was then observed. About one minute after immersion the plate was removed, cleaned of adhering surplus material by brushing and weighed. Evaluation showed that about 98% of the pore volume was filled with paste.

EXAMPLE 2

About 405 g nickel hydroxide powder and about 12.5 g cobalt powder were ground with about 182 g of an approximately 5% aqueous sodium polyphosphate solution in a porcelain ball mill of about 1 liter capacity using about 540 g aluminum oxide grinding balls of about 16 mm diameter at about 70 revolutions/min for about 16 hours. The paste obtained in this way had a yield value of about 105 Pa and a plastic viscosity of about 300 mPas. The maximum granulometry measured by the grindometer was about 23$\mu$. The paste had an active substance content of about 36.7 vol % nickel hydroxide and about 0.5 vol % cobalt. After separation from the grinding balls, the paste was transferred into a steel vessel which was fastened on an agitating table. The vibration energy introduced into the paste was adjusted so that the paste did not quite spatter on the surface, which was the case at a frequency of about 40 Hz with an amplitude of about 1.25 mm. The electrode plate to be filled consisted of about 4 mm thick nickel-plated fiber plate of polypropylene non-woven with a porosity of about 85%. The average pore size, calculated from the fiber diameter and the weight of the sample before and after nickel-plating, was 78$\mu$. The plate was supported by the welded tab and remained submerged in the vibrated fluidized paste for about one minute. On extraction, the plate was passed between rubber lips, which wiped off the still unsolidified surplus paste. By virtue of the set viscosity, the paste did not flow out of the filled pores of the plate. A filling of about 96% of the pore volume and an active substance content of about 1.4 g/ml void volume were arrived at from the weight of the empty and filled plate and from the dry weight after drying at about 80° C. No variation of the concentration, or variation of the content of water or solid in the paste over the experimental period was found from a plurality of a consecutively performed impregnation experiments and from the determination of the water content of the paste.

EXAMPLE 3

About 600 g iron(III) oxide (Bayferrox 1370, Manufacturer Bayer AG) and about 121.8 g of an approximately 2% aqueous sodium polyphosphate solution (Kalgon 322, Manufacturer Benckiser-Knapsack), which additionally contained about 1.5 weight % polyvinyl alcohol, were mixed for about 30 min in a laboratory mixer. The active substance content in the paste thus produced was about 48.8 vol %. The flow curve correspond to a non-ideal plastic behavior, that is to say after the yield value was exceeded the shear rate in the range of small values did not increase linearly with the tensile stress at first. From the linear part of the flow curve, a yield value of about 29 Pa and a plastic viscosity of about 760 mPas were calculated up to the shear rate of about 130/s. After the paste had been transferred into a tank, a perforated sheet metal cage of U-shaped configuration open at end faces was inserted into the tank, which was connected by a rigid sheet metal arm to an electromagnetic vibrator fitted above the vessel. The perforated sheet metal cage was made to vibrate at about 50 Hz and about 1 mm amplitude and fluidized the paste of active substance. A plate about 1.5 mm thick made of nickel-plated polypropylene non-woven according to Example 2 was placed in suspension in the cage by its tag connected to the top edge of the plate. After about a 30 second dwell time in the fluidized paste and wiping off the surplus, differential weighing revealed a virtually complete filling of the plate.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A paste having an active substance for vibration filling of foam-structure or fiber-structure electrode plates for galvanic cells, said paste having
   an active substance content in the range of from approximately to 25 to 60 percent by volume;
   maximum active particle size of approximately 0.04 mm; and
   in the unvibrated state, having a yield value in the range of about 10 to 120 Pa and a plastic viscosity in the range of about 0.1 to 1 Pa.s at about 20° C.; and
   said paste having a dispersing agent selected from the group of water-soluble salts of polyphosphoric acid.

2. A paste of active substance according to claim 1, wherein the dispersing agent is a water-soluble alkali salt of polyphosphoric acid.

3. A paste of active substance according to claim 1, which contains at least one of a cobalt powder and cobalt compounds from oxide, hydroxide, bromate and phosphate classes.

4. A paste of active substance according to claim 1 wherein said active substance comprises nickel and cobalt, and wherein total cobalt content amounts to up to about 12 atomic percent, relative to nickel, in the paste.

* * * * *